United States Patent [19]
Hoelzemann et al.

[11] Patent Number: 5,929,909
[45] Date of Patent: Jul. 27, 1999

[54] VIDEOPHONE SYSTEM HAVING A CAMERA AND A SHUTTER

[75] Inventors: Herbert Hoelzemann, Rennes, France; Bernhard Seegert, Villingen, Germany; Manfred Spruck, Vern sur Seiche, France

[73] Assignee: Deutsche Thomson-Brandt GmbH, Villingen-Schwenningen, Germany

[21] Appl. No.: 08/718,824

[22] Filed: Sep. 24, 1996

[30] Foreign Application Priority Data

Oct. 26, 1995 [DE] Germany .................... 195 39 803

[51] Int. Cl.⁶ .................... H04N 5/222; H04N 5/225
[52] U.S. Cl. .................... 348/372; 348/367; 348/371
[58] Field of Search .................... 348/372, 371, 348/367, 370, 241, 226

[56] References Cited

U.S. PATENT DOCUMENTS

| 3,798,367 | 3/1974 | Schneider | 178/7.2 |
| 4,076,414 | 2/1978 | Tulbert | 355/38 |
| 4,532,550 | 7/1985 | Bendell et al. | 358/213 |
| 4,597,015 | 6/1986 | Johnson | 358/225 |
| 4,774,588 | 9/1988 | Noda et al. | 178/7.2 |
| 4,913,547 | 4/1990 | Moran | 356/349 |
| 4,992,855 | 2/1991 | Takei | 358/29 |
| 5,406,323 | 4/1995 | Tanigaki et al. | 348/15 |

FOREIGN PATENT DOCUMENTS

| 0433123 | 2/1995 | European Pat. Off. | H04N 3/15 |
| 3534986 | 10/1985 | Germany | H04N 5/217 |
| 3831643 | 9/1988 | Germany | H04N 7/14 |

OTHER PUBLICATIONS

JP Patents Abstracts of Japan 2–179075 A. E–984, Sep. 27, 1990.

JP Patents Abstracts of Japan 56–149183 A. E–95, Feb. 19, 1982.

*Primary Examiner*—Wendy Garber
*Assistant Examiner*—Jacqueline Wilson
*Attorney, Agent, or Firm*—Joseph S. Tripoli; Peter M. Emanuel; Frederick A. Wein

[57] ABSTRACT

A videophone system having an electronically controlled shutter to vary the amount of light falling onto the target by a shutter, e.g., for a greater or lesser length of time during a short exposure time rather than b y means of a controlled mechanical aperture. Data reduction is used for the transmitted signal, a control circuit is used for the exposure time, and the mains power supply, which produces ambient light, are coupled by means of a PLL circuit so that the exposure time occurs at the same phase of the mains voltage. In this way, interference occurring when data reduction is used for the signal to be transmitted is avoided and macroblocks are not formed when no difference signal is present.

10 Claims, 2 Drawing Sheets

VIDEOPHONE SYSTEM HAVING A CAMERA AND A SHUTTER

BACKGROUND

The invention is based on a videophone system. In the case of such a system, also called a videophone, the amount of light falling from the objective onto the target must be controllable. It is known for this purpose for an aperture to be provided, as in the case of a photographic apparatus, which is open to a greater or lesser width.

In order to reduce the costs of such a mechanically adjustable aperture, it is also known for a fixed aperture opening to be provided which can be opened or closed electronically only completely, like a shutter. The amount of light falling onto the target is controlled or regulated by this shutter being opened for a time of about 0.5–1 ms in each case, which is short in comparison with the frame duration. The amount of light falling onto the target is thus varied electronically in this case by varying the opening time of the shutter Such videophone systems normally use data reduction or data compression for the signal transmission. This comprises, for example, not transmitting the contents of an image in each case but only the differences between successive images. It has been found that faults occurred as a result of the data reduction in the case of a videophone system having a controlled exposure time of the type described. It has been found in particular that macroblocks were generated in the codec even in the case of a constant image, that is to say without any differences between successive images, even though there were no changes in the image between successive images. The use of data reduction for a camera having the said controlled exposure time thus appeared impossible or problematic.

SUMMARY OF THE INVENTION

The object of the invention is to design such a videophone system such that data reduction operates correctly even during the said operation with a controlled exposure time, and the production of superfluous macroblocks is prevented.

Advantageous developments of the invention are specified in the subclaims.

Thus, in the case of the invention, the control circuit which controls the exposure time or opening time of the shutter is coupled to the mains power supply by means of a PLL circuit in such a manner that the exposure time always occurs at the same phase of the mains voltage.

The invention is in this case based on the following knowledge and ideas. A videophone system operates predominantly in artificial light, in particular with fluorescent tubes. The brightness of the ambient light in the region of the object to be recorded is thus amplitude-modulated at twice the mains frequency, that is to say 100 Hz, said amplitude modulation being between 30% and 100%, or 90% and 100%, depending on the light source. The framing rate of the camera is admittedly likewise 50Hz, but its frequency and phase are not coupled to the mains frequency. The exposure time, which is short in comparison with the mains frequency, that is to say the opening time of the shutter, is thus as a rule shifted relative to the mains cycle as a result of minor frequency discrepancies. The exposure time thus occurs alternately at relatively high and relatively low brightness levels of the ambient light herein defined as light present in the environment, in the sense of beating. This results in amplitude modulation of the luminance signal and in changes in the colour temperature. Even if these changes are not perceptible in the reproduced image, they are recorded by the codec for data reduction, however, since such a codec responds even to signal changes of 3%. The codec thus records these undesirable signal changes even in the case of a stationary image as a signal and forms macroblocks for a difference signal, although there are no changes in the image. The invention is now used here in that the frequency and phase coupling between the framing rate of the camera and the mains frequency result in the short exposure time always being located at the same phase in the mains cycle and thus always when the ambient light has the same brightness level.

Overall, this solution results in the following advantages. Faults or inadequacies in the data reduction resulting from false formation of macroblocks are avoided. As a result of the fact that the exposure time is always located at the same ambient light brightness level, undesirable amplitude modulation of the luminance signal by beating is also avoided. In addition, there is a minimal difference in the gain in the colour channels and no undesirable change in the colour temperature. Furthermore, no automatic white trimming is required to correct for errors in the colour temperature. The constant white trimming achieved results in perfect colour reproduction without interference resulting from brightness modulation. As a result of the catchment range of the PLL circuit, a camera which operates at a framing rate of 50 Hz can also be synchronized to a mains power supply at 60 Hz.

The video signal generated by the camera, which is transmitted via the system to the receiving point, is preferably subjected to data reduction. This comprises, for example, only changes in the image between successive images being transmitted. Since, in the case of a videophone, experience has shown that changes in the image are relatively minor, the amount of data transmitted can be significantly reduced as a result or a transmission channel can be better utilized.

The PLL circuit is preferably adjusted such that the exposure time occurs at the maximum of the mains voltage. This results in an optimum light yield from the image projected onto the target. The mains voltage can be applied electrically to the PLL circuit. A voltage derived from the stray magnetic field of the power supply unit can likewise be applied to the PLL circuit.

Alternatively, a brightness sensor in the form of a photodiode can also be provided for the ambient light and can be connected via an evaluation circuit to the PLL circuit. This solution has the advantage that there is then no need for any circuitry access to the mains.

The oscillator of the PLL circuit preferably oscillates at a frequency which is high in comparison with the mains frequency, and a frequency divider, which divides the high frequency down to the mains frequency and framing rate again, is located between the output and an input of the PLL circuit. Such a PLL circuit having an increased oscillator frequency has the advantage of a simpler circuit and greater accuracy. If the camera is not connected to the mains power supply, for example operates using a rechargeable battery, a voltage at the mains frequency is not available, so that the information about the nominal frequency and the nominal phase of the image frequency is then missing. In this case, the oscillator of the PLL circuit runs freely without being synchronized by a nominal frequency.

A voltage-controlled phase shifter is preferably located in the path of the mains voltage to the PLL circuit and is controlled by a microprocessor which controls the camera operation. The optimum operating point, that is to say the shutter opening or exposure time when the ambient light is at its maximum brightness, can then be set automatically. The phase shift of the phase shifter is continuously varied between 0 and 180° for this purpose, and the exposure time set by the processor is measured at the same time. The optimum value of the phase shift now occurs at the minimum exposure time and can be set to a fixed value.

BRIEF DESCRIPTION OF THE DRAWINGS

The invention will be explained in the following text with reference to the drawing, in which.

DESCRIPTION OF THE PREFERRED EMBODIMENTS

Figure 1:
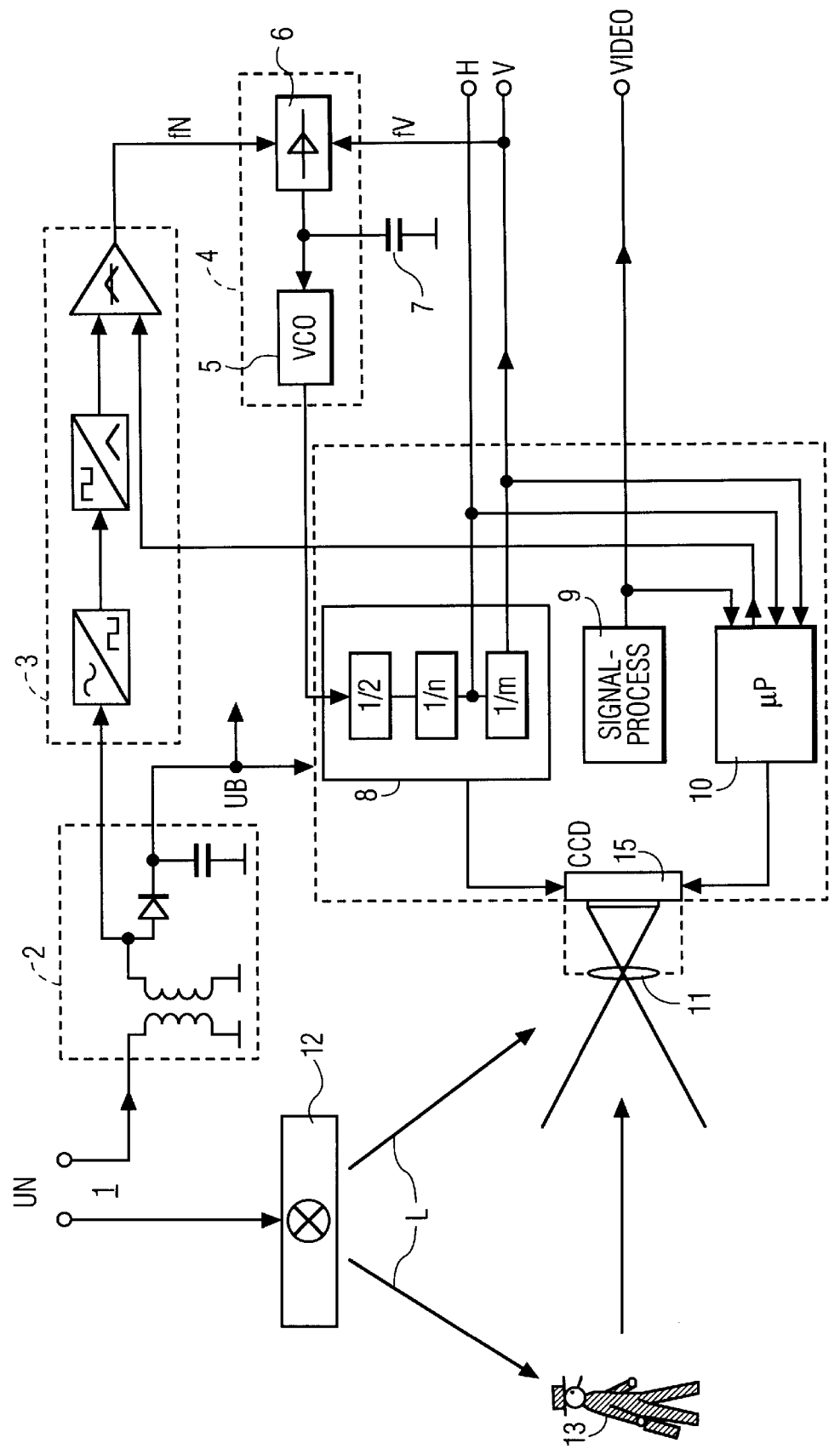
FIG. 1 shows a block diagram of a videophone system.

FIG. 1 shows the mains terminals 1 with the mains voltage UN, the power supply unit 2, the voltage-controlled phase shifter 3, the PLL circuit 4 with the VCO oscillator 5, the phase comparison stage 6 and the externally connected filter element 7. The illustration also shows the frequency divider 8 for conversion of the frequency of the oscillator 5, which frequency is high in comparison with the mains frequency, the signal processor 9, the, CCD target 15 which contains the controlled shutter, the objective 11, the fluorescent tube 12, which is fed from the mains voltage UN, for producing the ambient light L, and the object 13 which is to be recorded by the camera.

Figure 2A:
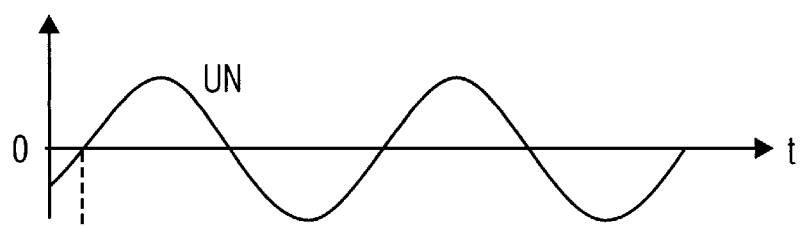
FIG. 2 shows curves in order to explain the method of operation of the arrangement according to FIG. 1.
Figure 2B:
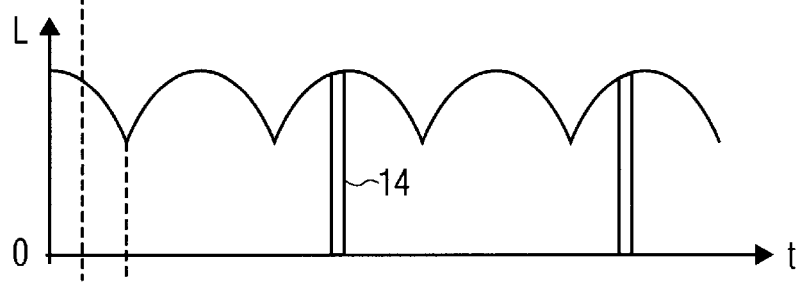
Figure 2C:
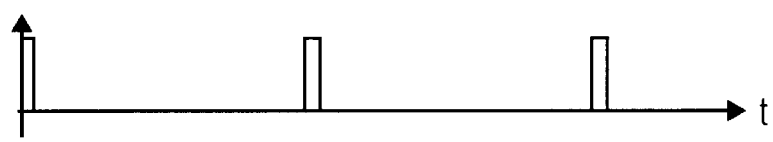
Figure 2D:
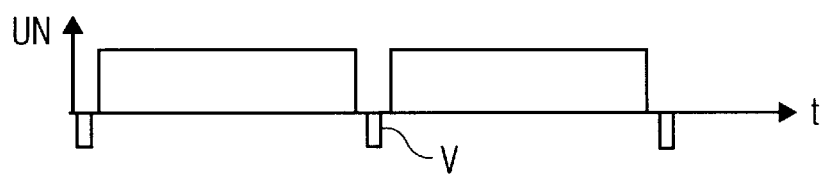
Figure 2E:
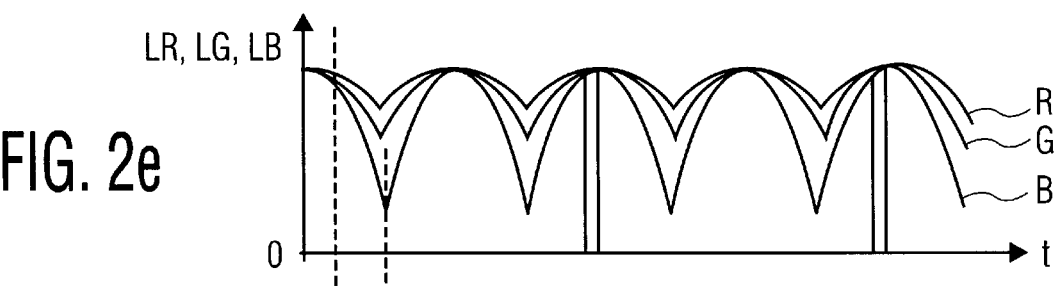
Figure 2F:
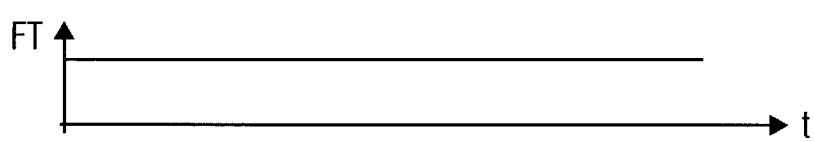

The method of operation of the arrangement according to FIG. 1 will be explained with reference to FIG. 2. The mains voltage UN according to FIG. 2a initially produces the operating voltage UB, via the power supply unit 2, for the individual stages of the system. The mains voltage UN additionally passes via the phase shifter 3 to an input of the phase comparison stage 4. FIG. 2b shows the amplitude of the brightness of the ambient light L and, in the form of the black bars 14, the exposure time or opening time of the shutter, whose duration is short in comparison with the mains cycle. It can be seen that the exposure or the opening of the shutter is now always located at the same phase of the brightness L and of the mains voltage UN as a result of the phase coupling by means of the PLL circuit 4, and thus any modulation of the brightness, change in the colour temperature and undesirable formation of macroblocks when there are no differences between successive images are avoided. In addition, the exposure time is always located at the maximum brightness L, so that an optimum light yield is ensured. FIG. 2c shows the pulses which in each case initiate the opening of the shutter for the CCD target 15. FIG. 2d shows symbolically the amplitude of the output signal Y with the vertical sync pulses V in simplified form for an image without modulation. This is intended to indicate that the amplitude of Y is constant and is not amplitude-modulated in an undesirable manner. FIG. 2e shows the intensity of the fluorescent light in the form of the RGB components R, G, B. It can be seen that the exposure phase is once again constant relative to the mains phase, and minimal differences occur in the RGB channels. By analogy with FIG. 2d, FIG. 2f shows the colour temperature FT, which is constant in the same way as the luminance signal Y, as a result of the phase coupling.

The microprocessor 10 controls the phase shift of the phase shifter 3 as follows. The phase shift of the phase shifter 3 is automatically and continuously varied between 0 and 180°. In this case, the exposure time of the target 15 set by the microprocessor 10 is measured at the same time. When this exposure time is at its minimum value, this means that the light yield is a maximum. The phase shift of the phase shifter 3 is then permanently set at this value. This ensures that the exposure time according to FIG. 2b is always located at the maximum of the illumination L.

We claim:

1. Videophone system having a camera and a shutter which is in each case opened by a control circuit only for a short exposure time, wherein the control circuit and a mains power supply which powers the production of an ambient light are coupled by means of a PLL circuit in such a manner that the exposure time always occurs at the same phase of a mains voltage from the mains power supply.

2. System according to claim 1, wherein a signal produced by the camera and to be transmitted is subjected to data reduction.

3. System according to claim 2, wherein the data reduction comprises only changes in an image between successive images being transmitted.

4. System according to claim 1, wherein the PLL circuit is set such that an exposure time occurs at the maximum of the mains voltage.

5. System according to claim 1, wherein the mains voltage is applied to the PLL circuit.

6. System according to claim 1, wherein a voltage which is derived from a stray magnetic field from the mains power supply is applied to the PLL circuit.

7. System according to claim 1, wherein a brightness sensor is provided for the ambient light and is connected via an evaluation circuit to the PLL circuit.

8. System according to claim 1, wherein an oscillator of the PLL circuit oscillates at a frequency which is high in comparison with a mains frequency and a frequency divider is located between an output and an input of the PLL circuit.

9. System according to claim 1, wherein a voltage-controlled phase shifter is located in the path of a mains voltage to the PLL circuit and is controlled by a microprocessor which controls the camera operation.

10. System according to claim 8, wherein the frequency divider is part of a timing generator.

* * * * *